US012584835B2

(12) United States Patent (10) Patent No.: US 12,584,835 B2
Hyatt et al. (45) Date of Patent: Mar. 24, 2026

(54) COMPUTER NUMERICALLY CONTROLLED MACHINE SYSTEMS AND METHODS FOR MECHANICALLY TESTING ADDITIVE MANUFACTURED SPECIMENS

(71) Applicant: DMG MORI CO., LTD., Nara (JP)

(72) Inventors: Gregory A. Hyatt, South Barrington, IL (US); Fred M. Carter, Glenview, IL (US)

(73) Assignee: DMG MORI CO., LTD., Nara (JP)

( * ) Notice: Subject to any disclaimer, the term of this patent is extended or adjusted under 35 U.S.C. 154(b) by 450 days.

(21) Appl. No.: 18/240,084

(22) Filed: Aug. 30, 2023

(65) Prior Publication Data

US 2025/0076165 A1 Mar. 6, 2025

(51) Int. Cl.
 *G01N 3/02* (2006.01)
 *G05B 19/401* (2006.01)

(52) U.S. Cl.
 CPC ............. *G01N 3/02* (2013.01); *G05B 19/401* (2013.01); *G05B 2219/37533* (2013.01)

(58) Field of Classification Search
 CPC .................... G01N 3/02; G05B 19/401; G05B 2219/37533
 See application file for complete search history.

(56) References Cited

U.S. PATENT DOCUMENTS

| | | | |
|---|---|---|---|
| 4,078,195 A | 3/1978 | Mathias et al. | |
| 4,563,906 A | 1/1986 | Mathias | |
| 6,622,571 B2 | 9/2003 | Chen | |
| 8,383,985 B2 | 2/2013 | Twelves, Jr. et al. | |
| 9,778,158 B2 | 10/2017 | Bellemare et al. | |
| 9,903,781 B2 | 2/2018 | Drescher et al. | |
| 10,012,576 B2 | 7/2018 | Zhao et al. | |
| 10,254,206 B2 | 4/2019 | Schaefer et al. | |
| 10,295,341 B2 | 5/2019 | Garvey et al. | |
| 10,365,192 B2 * | 7/2019 | Deal .................... B29C 64/386 | |
| 2011/0209529 A1 * | 9/2011 | Hyatt ..................... B26F 3/004 | |
| | | | 73/37.5 |
| 2017/0138906 A1 | 5/2017 | Hartwig et al. | |
| 2017/0312821 A1 | 11/2017 | Defelice et al. | |
| 2018/0001570 A1 | 1/2018 | Cahn | |

(Continued)

FOREIGN PATENT DOCUMENTS

| | | |
|---|---|---|
| CN | 204882204 A | 12/2015 |
| CN | 106295079 A | 1/2017 |

(Continued)

*Primary Examiner* — Jamel E Williams
(74) *Attorney, Agent, or Firm* — von Briesen & Roper, s.c.

(57) ABSTRACT

Methods and systems for testing a material quality executed by a computer numerically controlled machine include a carrier plate coupled to a first tool holder of the computer numerically controlled machine, the carrier plate including a first test specimen formed of an additive manufacturing material, a testing tool coupled to a second tool holder of the computer numerically controlled machine, the testing tool including a specimen interface, and engaging the first test specimen with the specimen interface of the testing tool. Relative movement between the first and second tool holders causes the testing tool to execute a first test toolpath relative to the first test specimen, during which is obtained a first set of test data indicative of mechanical properties of the first test specimen.

20 Claims, 18 Drawing Sheets

(56)          References Cited

U.S. PATENT DOCUMENTS

| | | | |
|---|---|---|---|
| 2018/0111192 | A1 | 4/2018 | Ralls et al. |
| 2018/0243881 | A1 | 8/2018 | Campolo et al. |
| 2018/0299359 | A1 | 10/2018 | Troitino Lopez et al. |
| 2019/0015901 | A1 | 1/2019 | Haberland et al. |
| 2019/0033053 | A1 | 1/2019 | Eppler et al. |

FOREIGN PATENT DOCUMENTS

| | | | |
|---|---|---|---|
| CN | 106383059 | A | 2/2017 |
| CN | 108312543 | A | 7/2018 |
| DE | 10044519 | A1 | 3/2002 |

* cited by examiner

COMPUTER NUMERICALLY CONTROLLED MACHINE SYSTEMS AND METHODS FOR MECHANICALLY TESTING ADDITIVE MANUFACTURED SPECIMENS

BACKGROUND

Technical Field

The present disclosure generally relates to computer numerically controlled machines, and more particularly, to systems and methods for test specimens built using additive manufacturing techniques.

Description of the Related Art

Traditionally, materials are processed into desired shapes and assemblies through a combination of rough fabrication techniques (e.g., casting, rolling, forging, extrusion, and stamping) and finish fabrication techniques (e.g., machining, welding, soldering, polishing). To produce a complex assembly in final, usable form ("net shape"), a condition which requires not only the proper materials formed in the proper shapes, but also having the proper combination of metallurgical properties (e.g., various heat treatments, work hardening, complex microstructure), typically requires considerable investment in time, tools, and effort.

One or more of the rough and finish processes may be performed using Computer Numerically Controlled (CNC) machine tools. Such machine tools include lathes, milling machines, grinding machines, and other tool types. More recently, machining centers have been developed, which provide a single machine having multiple tool types and capable of performing multiple different machining processes. Machining centers may generally include one or more tool holders, such as spindles and turrets configured to hold one or more tools, and a workpiece holder, such as a pair of chucks. The workpiece holder may be stationary or move (in translation and/or rotation) while a tool is brought into contact with the workpiece, thereby performing a subtractive manufacturing process during which material is removed from the workpiece.

Because of cost, expense, complexity, and other factors, more recently there has been interest in alternative techniques which would allow part or all of the conventional materials fabrication procedures to be replaced by additive manufacturing techniques. In contrast to subtractive manufacturing processes, which focus on precise removal of material from a workpiece, additive manufacturing processes precisely add material, typically in a computer-controlled environment. While additive manufacturing techniques may improve efficiency and reduce waste, they may also expand manufacturing capabilities such as by permitting seamless construction of complex configurations which, using conventional manufacturing techniques, would have to be assembled from a plurality of component parts. For the purposes of this specification and the appended claims, the term 'plurality' consistently is taken to mean "two or more." The opportunity for additive techniques to replace subtractive processes depends on several factors, such as the range of materials available for use in the additive processes, the size and surface finish that can be achieved using additive techniques, and the rate at which material can be added. Additive processes may advantageously be capable of fabricating complex precision net-shape components ready for use. In some cases, however, the additive process may generate "near-net shape" products that require some degree of finishing.

Frequently, one or more mechanical tests are performed on additive manufactured components to assess material quality. Typical testing may include destructive and non-destructive inspection techniques that are performed in dedicated equipment provided off-line from the manufacturing equipment. Consequently, conventional testing of additively manufactured components requires excessive time, costs, and complexity.

SUMMARY OF THE DISCLOSURE

In accordance with one aspect of the present disclosure, a material quality testing method executed by a computer numerically controlled machine includes coupling a carrier plate to a first tool holder of the computer numerically controlled machine, the carrier plate including a first test specimen formed of an additive manufacturing material, coupling a testing tool to a second tool holder of the computer numerically controlled machine, the testing tool including a specimen interface, and engaging the first test specimen with the specimen interface of the testing tool. The method further includes causing relative movement between the first and second tool holders so that the testing tool executes a first test toolpath relative to the first test specimen, and obtaining a first set of test data indicative of mechanical properties of the first test specimen as the testing tool executes the first test toolpath.

In accordance with another aspect of the present disclosure, a computer numerically controlled machine includes a first tool holder coupled to a carrier plate, the carrier plate including a first test specimen formed of an additive manufacturing material, and a second tool holder coupled to a testing tool, the testing tool including a specimen interface. Tool control circuitry is operatively coupled to the first tool holder and the second tool holder, the tool control circuitry comprising one or more central processing units and one or more memory devices, the one or more memory devices storing instructions that, when executed by the one or more central processing units, cause the tool control circuitry to position the first and second tool holders so that the specimen interface of the testing tool engages the first test specimen, cause relative movement between the first and second tool holders so that the testing tool executes a first test toolpath relative to the first test specimen, and obtain a first set of test data indicative of mechanical properties of the first test specimen as the testing tool executes the first test toolpath.

In accordance with a further aspect of the present disclosure, a computer numerically controlled machine includes a first tool holder coupled to a carrier plate, a second tool holder, a material deposition assembly, and a testing tool including a specimen interface. Tool control circuitry is operatively coupled to the first tool holder and the second tool holder, the tool control circuitry comprising one or more central processing units and one or more memory devices, the one or more memory devices storing instructions that, when executed by the one or more central processing units, cause the tool control circuitry to couple the material deposition assembly to the second tool holder, form at least a first test specimen on the carrier plate using the material deposition assembly, detach the material deposition assembly from the second tool holder, couple the testing tool to the second tool holder, position the first and second tool holders so that the specimen interface of the testing tool engages the first test specimen, cause relative movement between the first and second tool holders so that the testing tool executes a first test toolpath relative to the first test specimen, and obtain a first set of test data indicative of mechanical properties of the first test specimen as the testing tool executes the first test toolpath.

BRIEF DESCRIPTION OF THE DRAWINGS

For a more complete understanding of the disclosed methods and apparatus, reference should be made to the embodiment illustrated in greater detail on the accompanying drawings, wherein.

It should be understood that the drawings are not necessarily to scale and that the disclosed embodiments are sometimes illustrated diagrammatically and in partial views.

In certain instances, details which are not necessary for an understanding of the disclosed methods and apparatus or which render other details difficult to perceive may have been omitted. It should be understood, of course, that this disclosure is not limited to the particular embodiments illustrated herein.

DETAILED DESCRIPTION

Any suitable apparatus may be employed in conjunction with the methods disclosed herein. In some embodiments, the methods are performed using a computer numerically controlled machine, illustrated generally in FIGS. 1-10. A computer numerically controlled machine is itself provided in other embodiments. The machine 100 illustrated in FIGS. 1-10 is an NT-series machine, versions of which are available from DMG/Mori Seiki USA, the assignee of the present application. Alternatively, DMG/Mori Seiki's DMU-65 (a five-axis, vertical machine tool) machine tool, or other machine tools having different orientations or numbers of axes, may be used in conjunction with the apparatus and methods disclosed herein.

Figure 1:
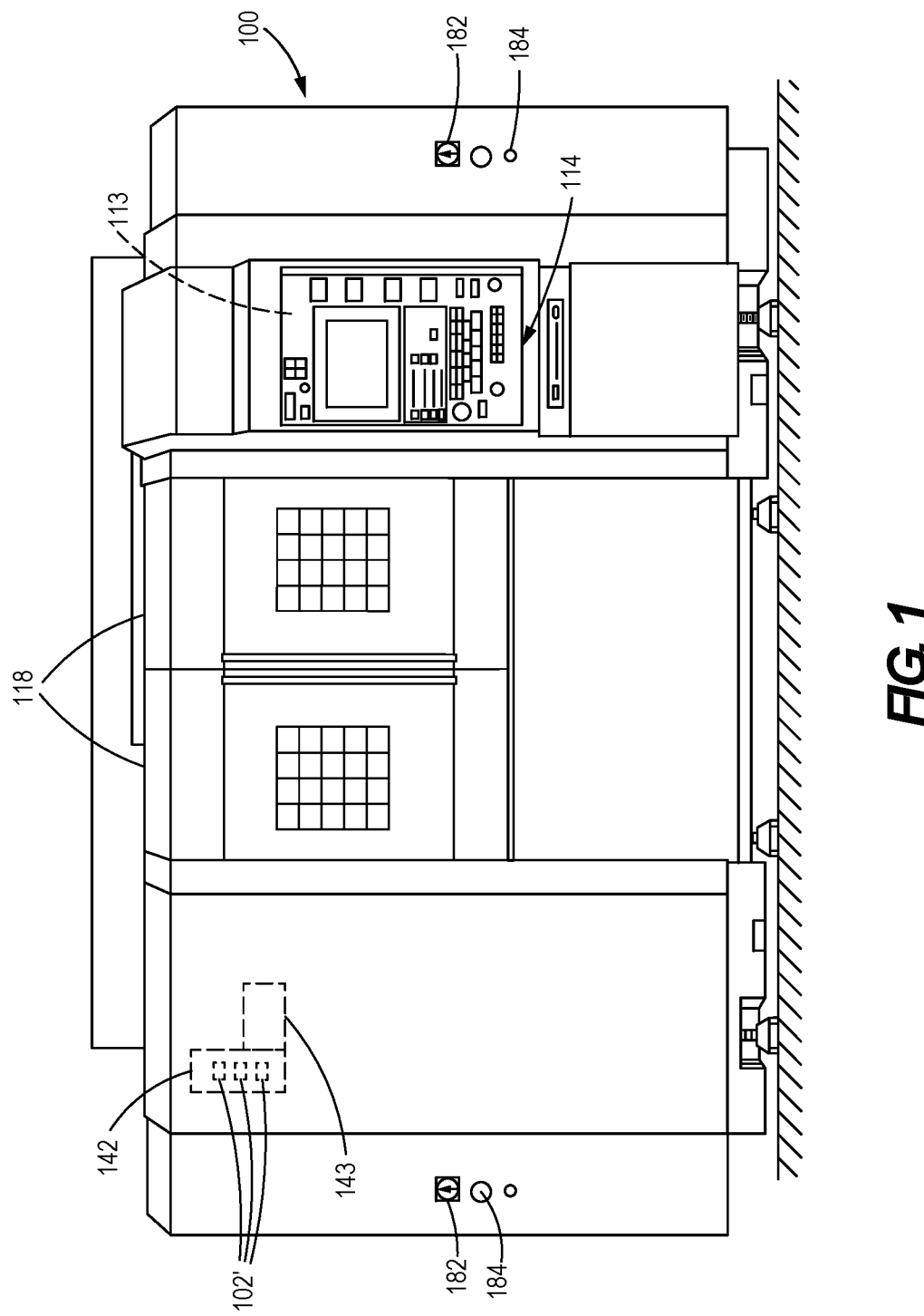
FIG. 1 is a front elevation of a computer numerically controlled machine in accordance with one embodiment of the present disclosure, shown with safety doors closed.
Figure 2:
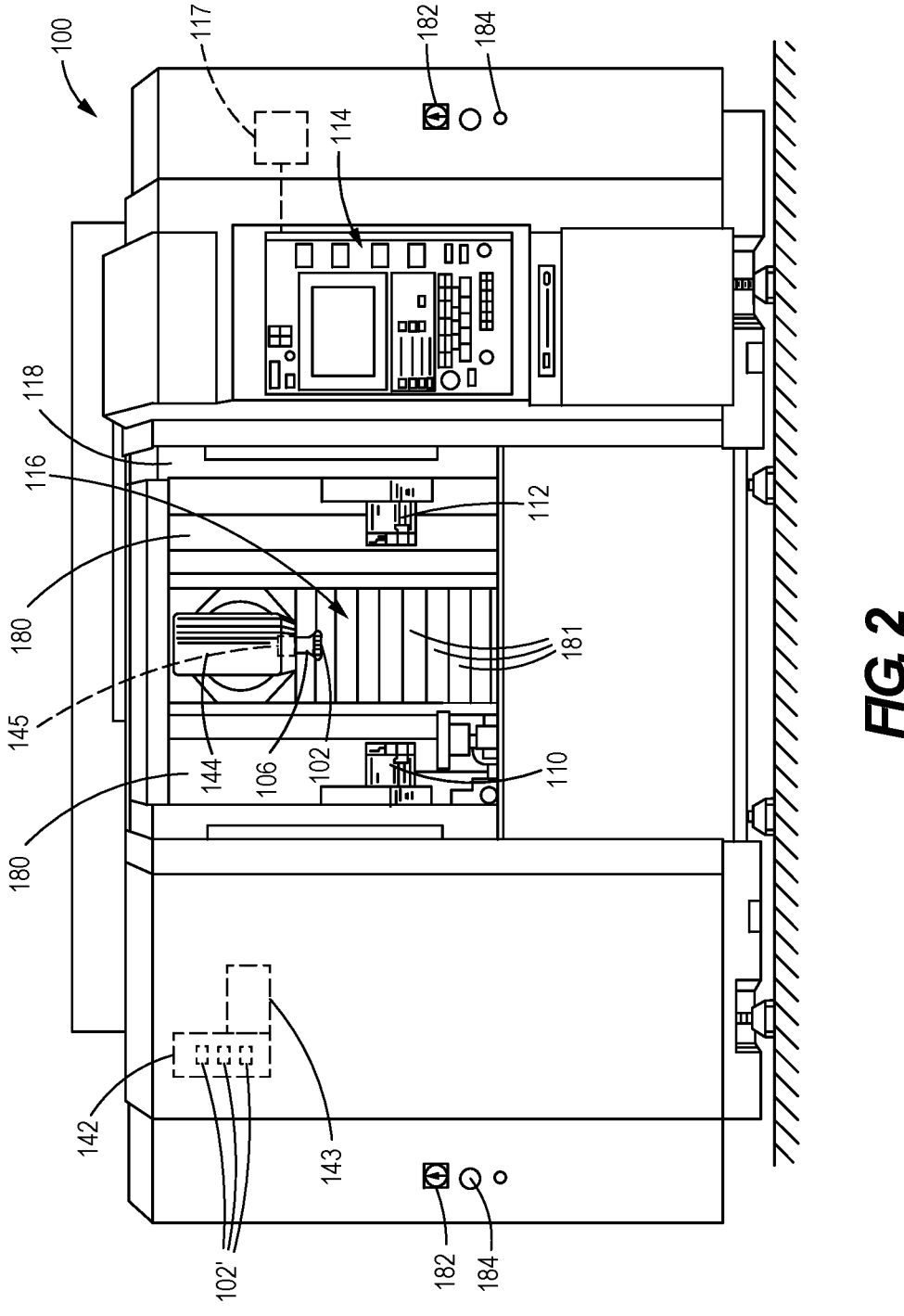
FIG. 2 is a front elevation of a computer numerically controlled machine illustrated in FIG. 1, shown with the safety doors open.
Figure 3:
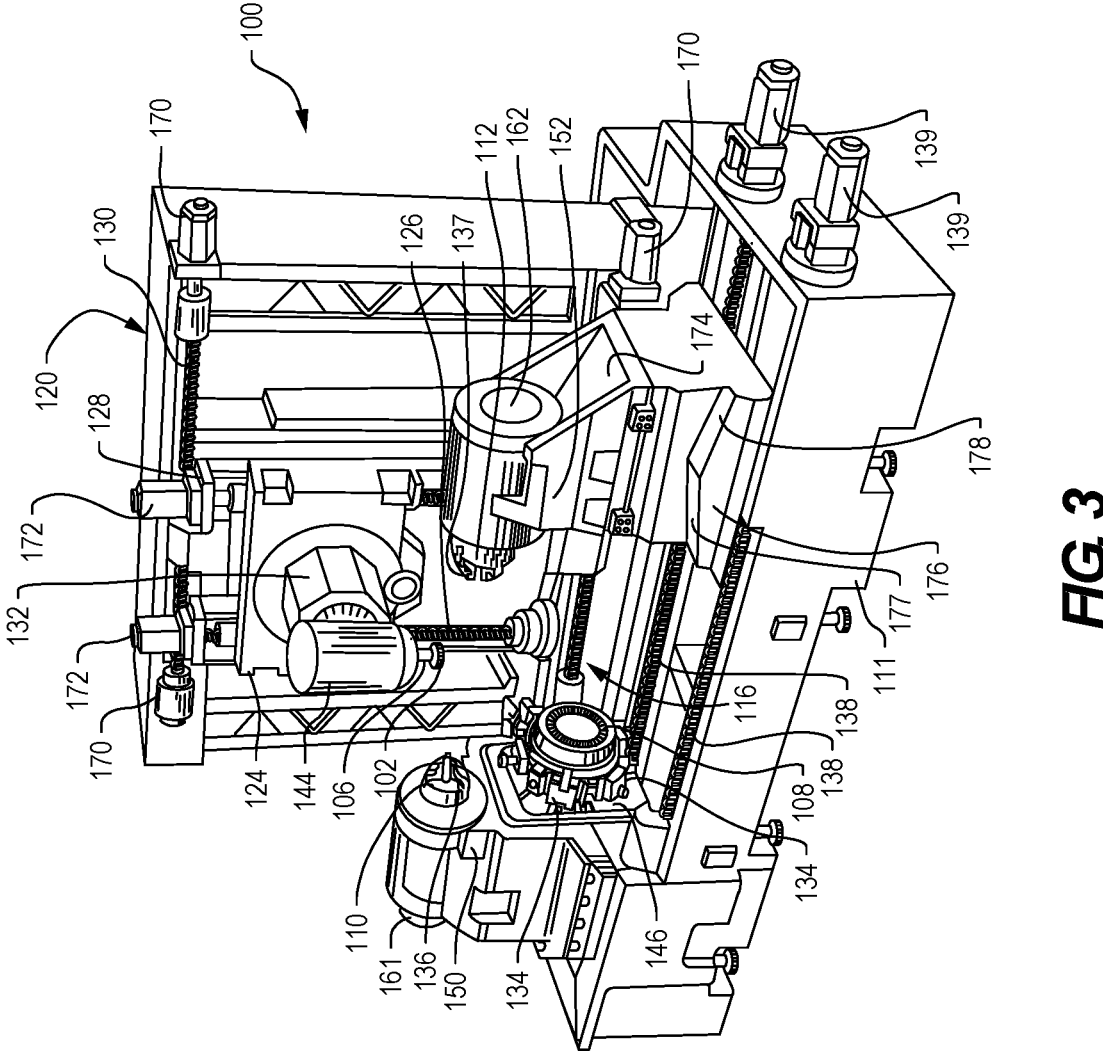
FIG. 3 is a perspective view of certain interior components of the computer numerically controlled machine illustrated in FIGS. 1 and 2, depicting a machining spindle, a first chuck, a second chuck, and a turret.

In general, with reference to the NT-series machine illustrated in FIGS. 1-3, one suitable computer numerically controlled machine 100 has at least a first holder and a second holder, each of which may be a tool holder (such as a spindle holder associated with spindle 144, a turret holder associated with a turret 108, or chucks 110, 112. In the embodiment illustrated in the Figures, the computer numerically controlled machine 100 is provided with a spindle 144, a turret 108, a first chuck 110, and a second chuck 112. The computer numerically controlled machine 100 also has a computer control system operatively coupled to the first tool holder and to the second tool holder for controlling the tool holders, as described in more detail below. It is understood that in some embodiments, the computer numerically controlled machine 100 may not contain all of the above components, and in other embodiments, the computer numerically controlled machine 100 may contain additional components beyond those designated herein.

As shown in FIGS. 1 and 2, the computer numerically controlled machine 100 has a machine chamber 116 in which various operations generally take place upon a workpiece (not shown). Each of the spindle 144, the turret 108, the first chuck 110, and the second chuck 112 may be completely or partially located within the machine chamber 116. In the embodiment shown, two moveable safety doors 118 separate the user from the machine chamber 116 to prevent injury to the user or interference in the operation of the computer numerically controlled machine 100. The safety doors 118 can be opened to permit access to the machine chamber 116 as illustrated in FIG. 2. The computer numerically controlled machine 100 is described herein with respect to three orthogonally oriented linear axes (X, Y, and Z), depicted in FIG. 4 and described in greater detail below. Rotational axes about the X, Y and Z axes are connoted "A," "B," and "C" rotational axes respectively.

The computer numerically controlled machine 100 is provided with a computer control system for controlling the various instrumentalities within the computer numerically controlled machine. In the illustrated embodiment, the machine is provided with two interlinked computer systems, a first computer system comprising a user interface system (shown generally at 114 in FIG. 1) and a second computer system (not illustrated) operatively connected to the first computer system. The second computer system directly controls the operations of the spindle, the turret, and the other instrumentalities of the machine, while the user interface system 114 allows an operator to control the second computer system. Collectively, the machine control system and the user interface system, together with the various mechanisms for control of operations in the machine, may be considered a single computer control system.

The computer control system may include tool control circuitry having a central processing unit (CPU) connected to a main memory. The CPU may include any suitable processor(s), such as those made by Intel and AMD. By way of example, the CPU may include a plurality of microprocessors including a master processor, a slave processor, and a secondary or parallel processor. Tool control circuitry, as used herein, comprises any combination of hardware, software, or firmware disposed in or outside of the machine 100 that is configured to communicate with or control the transfer of data between the machine 100 and a bus, another computer, processor, device, service, or network. The tool control circuitry, and more specifically the CPU, comprises one or more controllers or processors and such one or more controllers or processors need not be disposed proximal to one another and may be located in different devices or in different locations. The tool control circuitry, and more specifically the main memory, comprises one or more memory devices which need not be disposed proximal to one another and may be located in different devices or in different locations. The tool control circuitry is operable to execute all of the various machine tool methods and other processes disclosed herein.

In some embodiments, the user operates the user interface system to impart programming to the machine; in other embodiments, programs can be loaded or transferred into the machine via external sources. It is contemplated, for instance, that programs may be loaded via a PCMCIA interface, an RS-232 interface, a universal serial bus interface (USB), or a network interface, in particular a TCP/IP network interface. In other embodiments, a machine may be controlled via conventional PLC (programmable logic controller) mechanisms (not illustrated).

As further illustrated in FIGS. 1 and 2, the computer numerically controlled machine 100 may have a tool magazine 142 and a tool changer 143. These cooperate with the spindle 144 to permit the spindle to operate with any one of multiple tools. Generally, a variety of tools may be provided; in some embodiments, multiple tools of the same type may be provided.

The spindle 144 is mounted on a carriage assembly 120 that allows for translational movement along the X- and Z-axis, and on a ram 132 that allows the spindle 144 to be moved in the Y-axis. The ram 132 is equipped with a motor to allow rotation of the spindle in the B-axis, as set forth in more detail below. As illustrated, the carriage assembly has a first carriage 124 that rides along two threaded vertical rails (one rail shown at 126) to cause the first carriage 124 and spindle 144 to translate in the X-axis. The carriage assembly also includes a second carriage 128 that rides along two horizontally disposed threaded rails (one shown in FIG. 3 at 130) to allow movement of the second carriage 128 and spindle 144 in the Z-axis. Each carriage 124, 128 engages the rails via plural ball screw devices whereby rotation of the rails 126, 130 causes translation of the carriage in the X- or Z-direction respectively. The rails are equipped with motors 170 and 172 for the horizontally disposed and vertically disposed rails respectively.

The spindle 144 holds the tool 102 by way of a spindle connection and a tool retainer 106. The spindle connection 145 (shown in FIG. 2) is connected to the spindle 144 and is contained within the spindle 144. The tool retainer 106 is connected to the spindle connection and holds the tool 102. Various types of spindle connections are known in the art and can be used with the computer numerically controlled machine 100. Typically, the spindle connection is contained within the spindle 144 for the life of the spindle. An access plate 122 for the spindle 144 is shown in FIGS. 5 and 6.

The first chuck 110 is provided with jaws 136 and is disposed in a stock 150 that is stationary with respect to the base 111 of the computer numerically controlled machine 100. The second chuck 112 is also provided with jaws 137, but the second chuck 112 is movable with respect to the base 111 of the computer numerically controlled machine 100. More specifically, the machine 100 is provided with threaded rails 138 and motors 139 for causing translation in the Z-direction of the second stock 152 via a ball screw mechanism as heretofore described. To assist in swarf removal, the stock 152 is provided with a sloped distal surface 174 and a side frame 176 with Z-sloped surfaces 177, 178. Hydraulic controls and associated indicators for the chucks 110, 112 may be provided, such as the pressure gauges 182 and control knobs 184 shown in FIGS. 1 and 2. Each stock is provided with a motor (161, 162 respectively) for causing rotation of the chuck.

Figure 5:
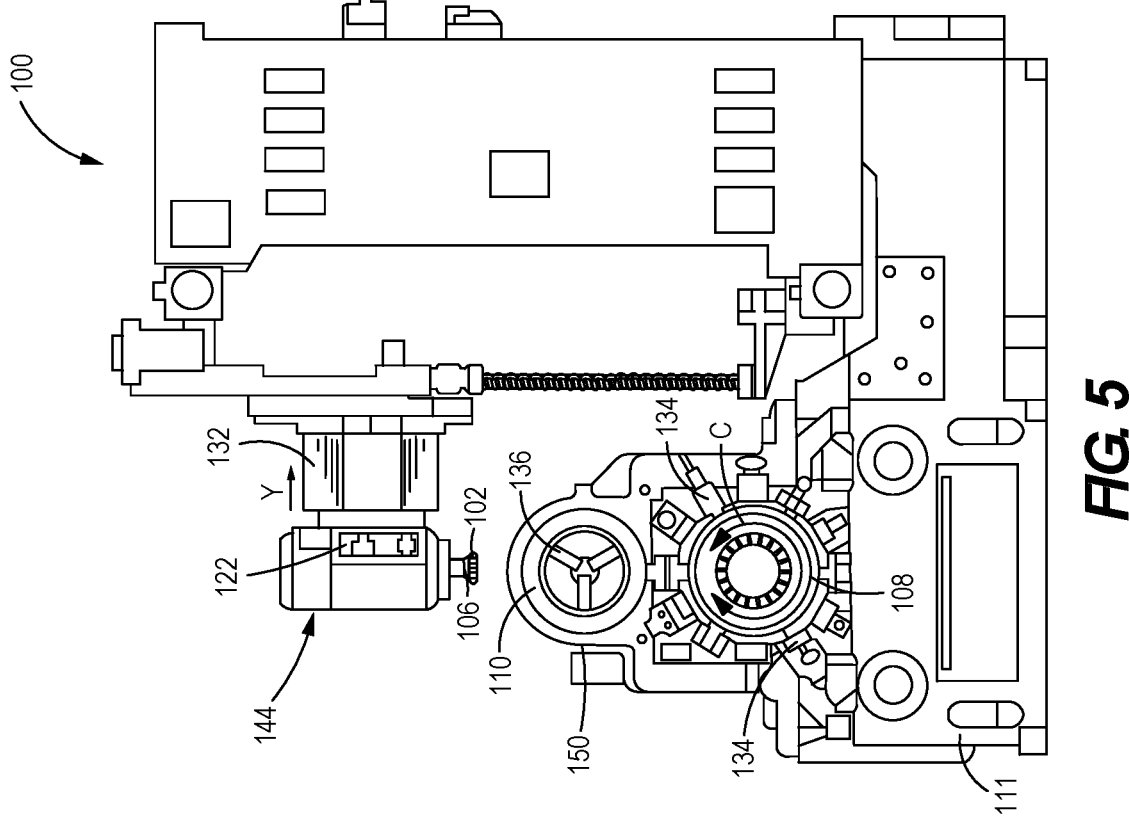
FIG. 5 is a side view of the first chuck, machining spindle, and turret of the machining center illustrated in FIG. 1.
Figure 6:
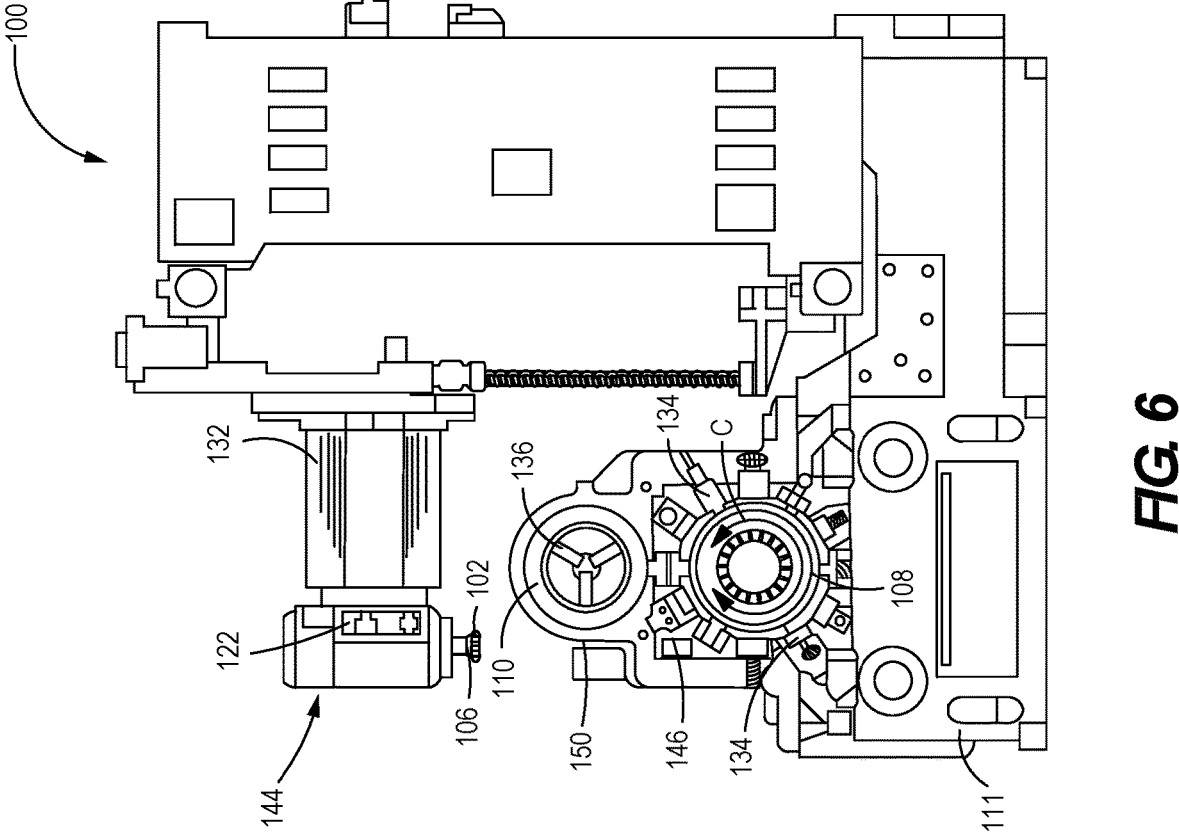
FIG. 6 is a view similar to FIG. 5 but in which a machining spindle has been translated in the Y-axis.
Figure 9:
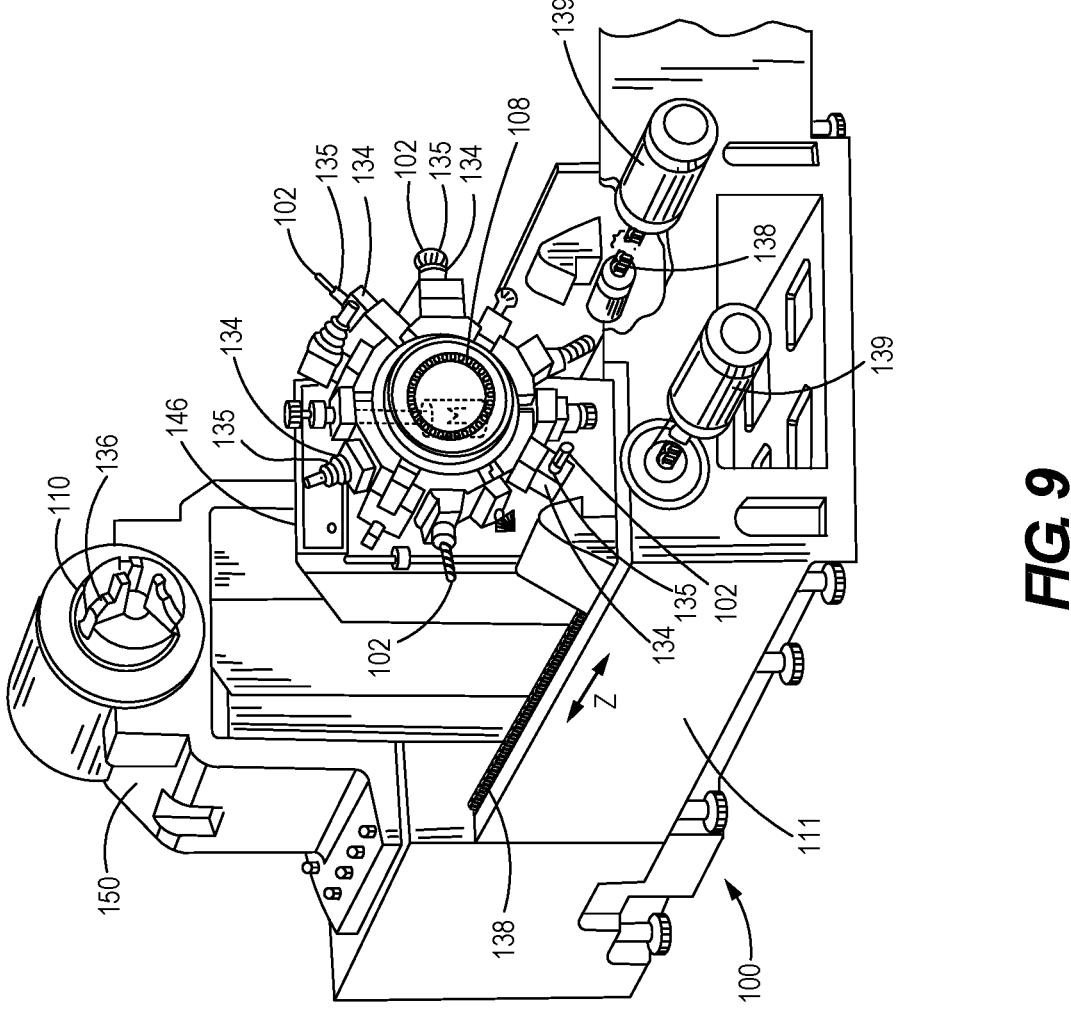
FIG. 9 is a perspective view of the first chuck and turret illustrated in FIG. 2, depicting movement of the turret and turret stock in the Z-axis relative to the position of the turret in FIG. 2.

The turret 108, which is best depicted in FIGS. 5, 6 and 9, is mounted in a turret stock 146 (FIG. 5) that also engages rails 138 and that may be translated in a Z-direction, again via ball-screw devices. The turret 108 is provided with various turret connectors 134, as illustrated in FIG. 9. Each turret connector 134 can be connected to a tool retainer 135 or other connection for connecting to a tool. Since the turret 108 can have a variety of turret connectors 134 and tool retainers 135, a variety of different tools can be held and operated by the turret 108. The turret 108 may be rotated in a C' axis to present different ones of the tool retainers (and hence, in many embodiments, different tools) to a workpiece.

Figure 4:
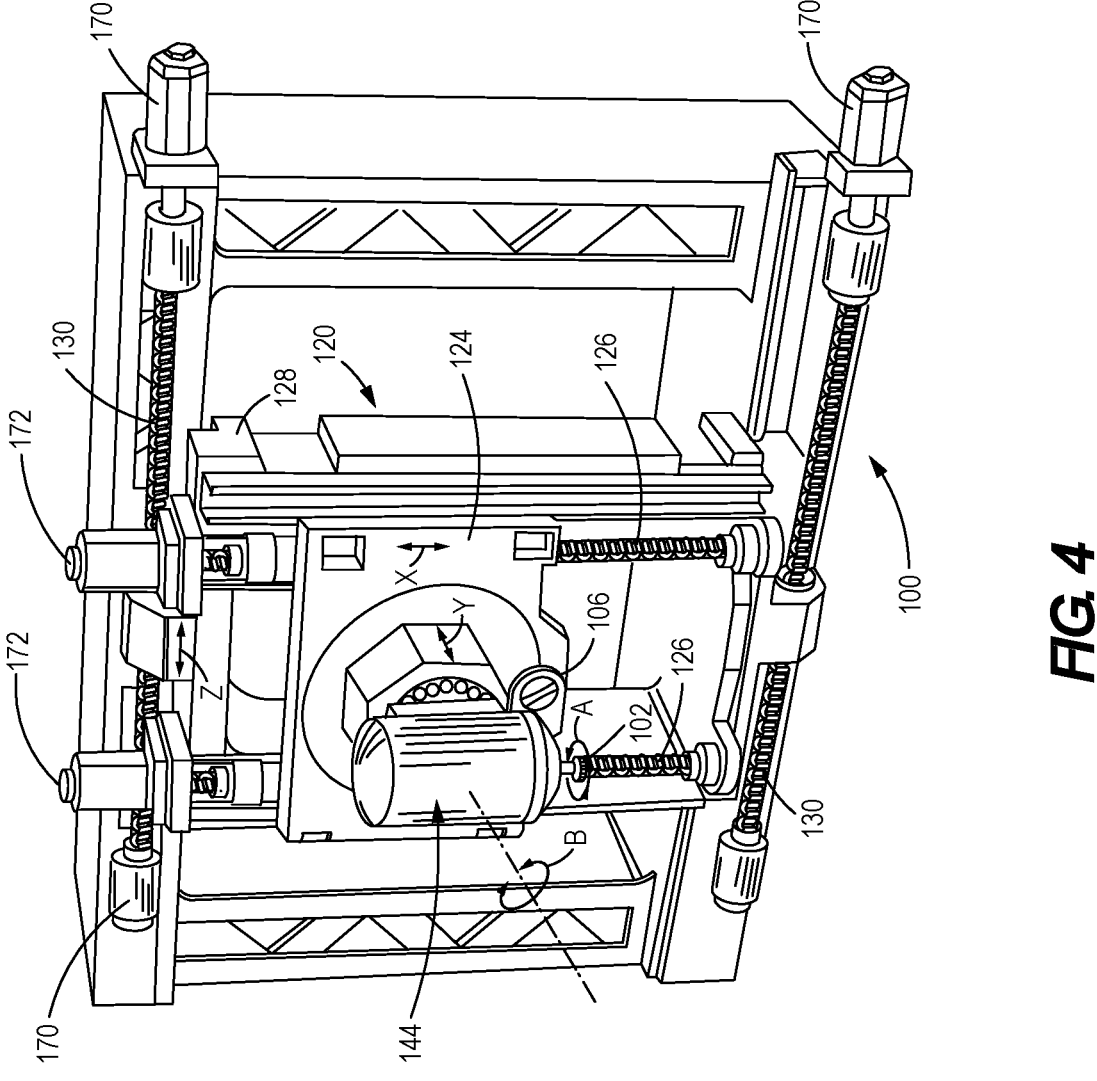
FIG. 4 a perspective view, enlarged with respect to FIG. 3 illustrating the machining spindle and the horizontally and vertically disposed rails via which the spindle may be translated.
Figure 7:
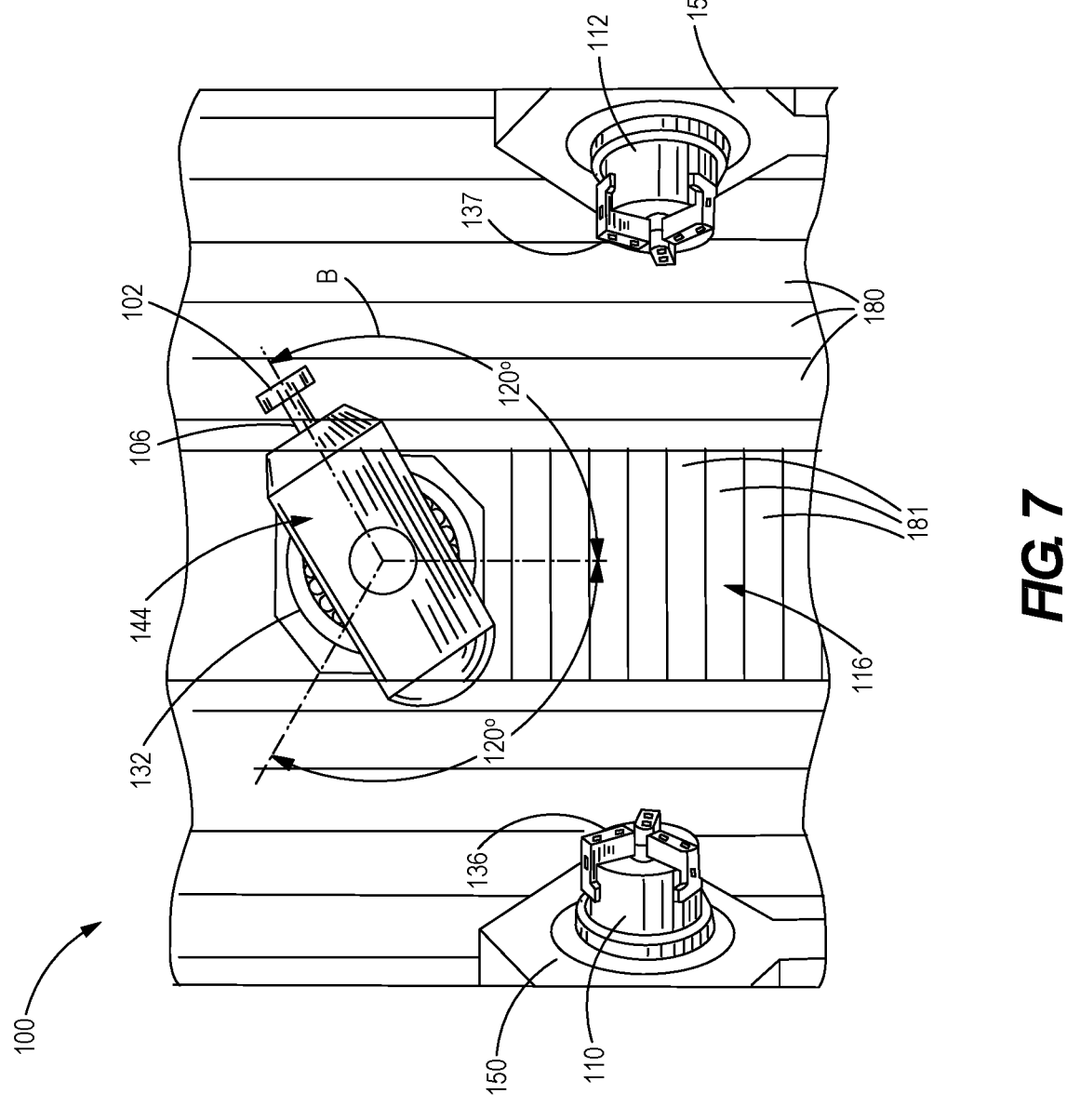
FIG. 7 is a front view of the spindle, first chuck, and second chuck of the computer numerically controlled machine illustrated in FIG. 1, including a line depicting the permitted path of rotational movement of this spindle.
Figure 8:
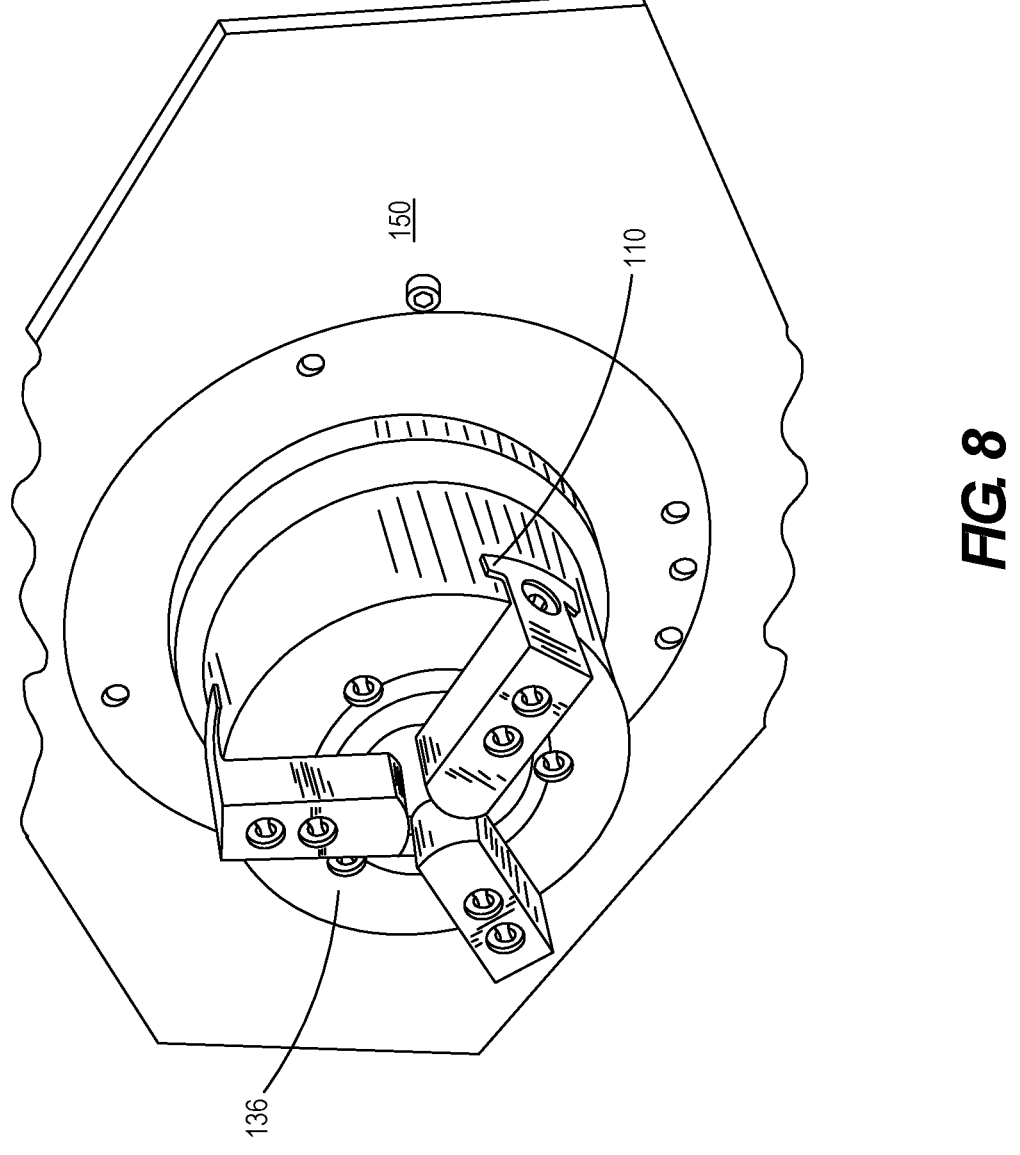
FIG. 8 is a perspective view of the second chuck illustrated in FIG. 3, enlarged with respect to FIG. 3.

It is thus seen that a wide range of versatile operations may be performed. With reference to tool 102 held in tool retainer 106, such tool 102 may be brought to bear against a workpiece (not shown) held by one or both of chucks 110, 112. When it is necessary or desirable to change the tool 102, a replacement tool 102 may be retrieved from the tool magazine 142 by means of the tool changer 143. With reference to FIGS. 4 and 5, the spindle 144 may be translated in the X and Z directions (shown in FIG. 4) and Y direction (shown in FIGS. 5 and 6). Rotation in the B axis is depicted in FIG. 7, the illustrated embodiment permitting rotation within a range of 120 degrees to either side of the vertical. Movement in the Y direction and rotation in the B axis are powered by motors (not shown) that are located behind the carriage 124.

Generally, as seen in FIGS. 2 and 7, the machine is provided with a plurality of vertically disposed leaves 180 and horizontal disposed leaves 181 to define a wall of the machine chamber 116 and to prevent swarf from exiting this chamber.

The components of the machine 100 are not limited to the heretofore described components. For instance, in some instances an additional turret may be provided. In other instances, additional chucks and/or spindles may be provided. Generally, the machine is provided with one or more mechanisms for introducing a cooling liquid into the machine chamber 116.

In the illustrated embodiment, the computer numerically controlled machine 100 is provided with numerous tool holders. Chuck 110 in combination with jaws 136 forms a tool holder, as does chuck 112 in combination with jaws 137. In many instances these tool holders will also be used to hold a workpiece. For instance, the chucks and associated stocks will function in a lathe-like manner as the headstock and optional tailstock for a rotating workpiece. Spindle 144 and spindle connection 145 form another tool holder. Similarly, the turret 108, when equipped with plural turret connectors 134, provides a plurality of tool holders (shown in FIG. 9).

The computer numerically controlled machine 100 may use any of a number of different types of tools known in the art or otherwise found to be suitable. For instance, the tool 102 may be a cutting tool such as a milling tool, a drilling tool, a grinding tool, a blade tool, a broaching tool, a turning tool, or any other type of cutting tool deemed appropriate in connection with a computer numerically controlled machine 100. Additionally or alternatively, the tool may be configured for an additive manufacturing technique, as discussed in greater detail below. In either case, the computer numerically controlled machine 100 may be provided with more than one type of tool, and via the mechanisms of the tool changer 143 and magazine 142, the spindle 144 may be caused to exchange one tool for another. Similarly, the turret 108 may be provided with one or more tools 102, and the operator may switch between tools 102 by causing rotation of the turret 108 to bring a new turret connector 134 into the appropriate position.

Figure 10:
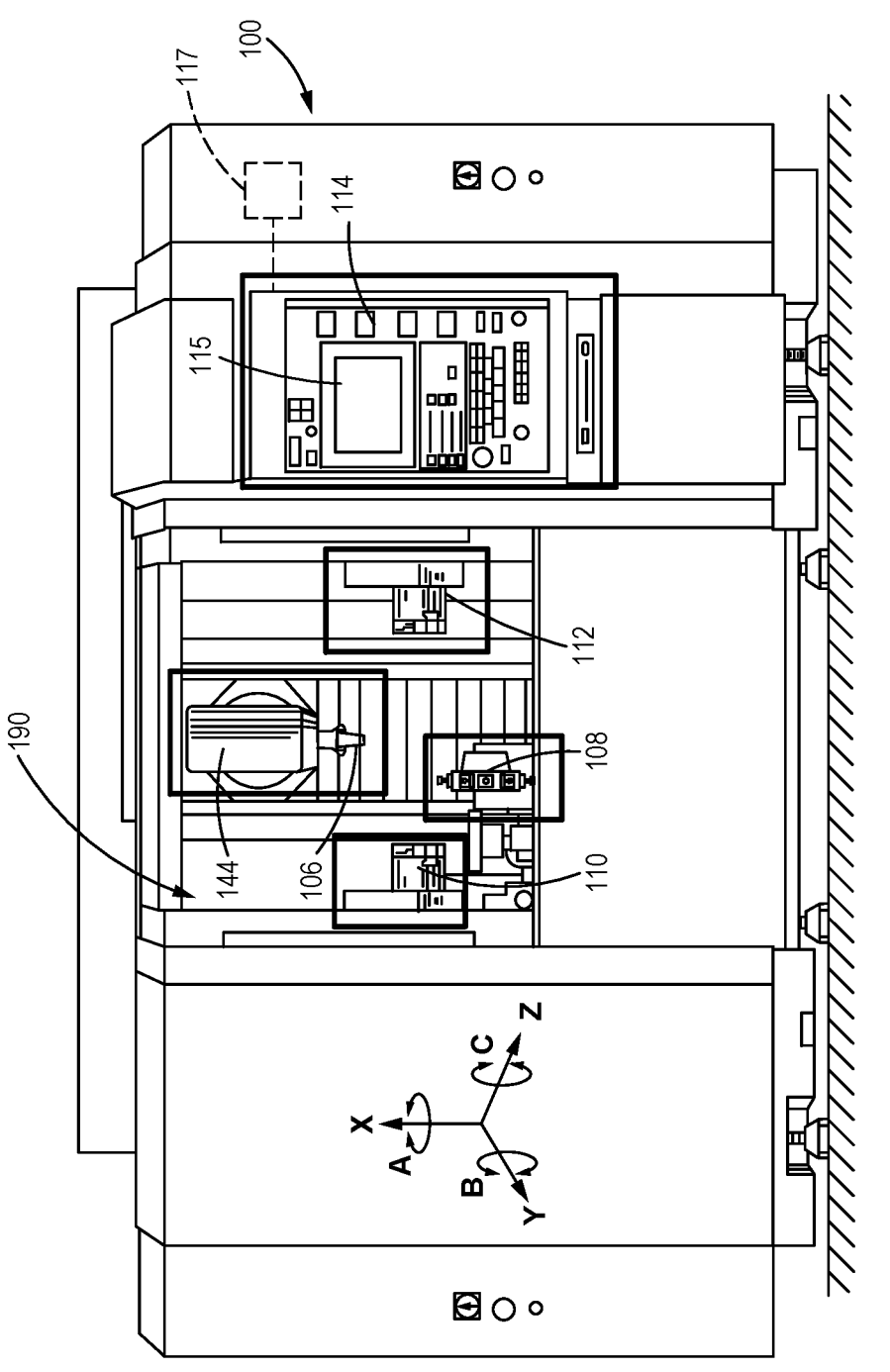
FIG. 10 is a front view of the computer numerically controlled machine of FIG. 1 with the front doors open.

The computer numerically controlled machine 100 is illustrated in FIG. 10 with the safety doors open. As shown, the computer numerically controlled machine 100 may be provided with at least a tool retainer 106 disposed on a spindle 144, a turret 108, one or more chucks or workpiece retainers 110, 112 as well as a user interface 114 configured to interface with a computer control system of the computer numerically controlled machine 100. Each of the tool retainer 106, spindle 144, turret 108 and workpiece retainers 110, 112 may be disposed within a machining area 190 and selectively rotatable and/or movable relative to one another along one or more of a variety of axes.

As indicated in FIG. 10, for example, the X, Y, and Z axes may indicate orthogonal directions of movement, while the A, B, and C axes may indicate rotational directions about the X, Y, and Z axes, respectively. These axes are provided to help describe movement in a three-dimensional space, and therefore, other coordinate schemes may be used without departing from the scope of the appended claims. Additionally, use of these axes to describe movement is intended to encompass actual, physical axes that are perpendicular to one another, as well as virtual axes that may not be physically perpendicular but in which the toolpath is manipulated by a controller to behave as if they were physically perpendicular.

With reference to the axes shown in FIG. 10, the tool retainer 106 may be rotated about a B-axis of the spindle 144 upon which it is supported, while the spindle 144 itself may be movable along an X-axis, a Y-axis and a Z-axis. The turret 108 may be movable along an XA-axis substantially parallel to the X-axis and a ZA-axis substantially parallel to the Z axis. The workpiece retainers 110, 112 may be rotatable about a C-axis, and further, independently translatable along one or more axes relative to the machining area 190. While the computer numerically controlled machine 100 is shown as a six-axis machine, it is understood that the number of axes of movement is merely exemplary, as the machine may be capable of movement in less than or greater than six axes without departing from the scope of the claims.

Figure 11:
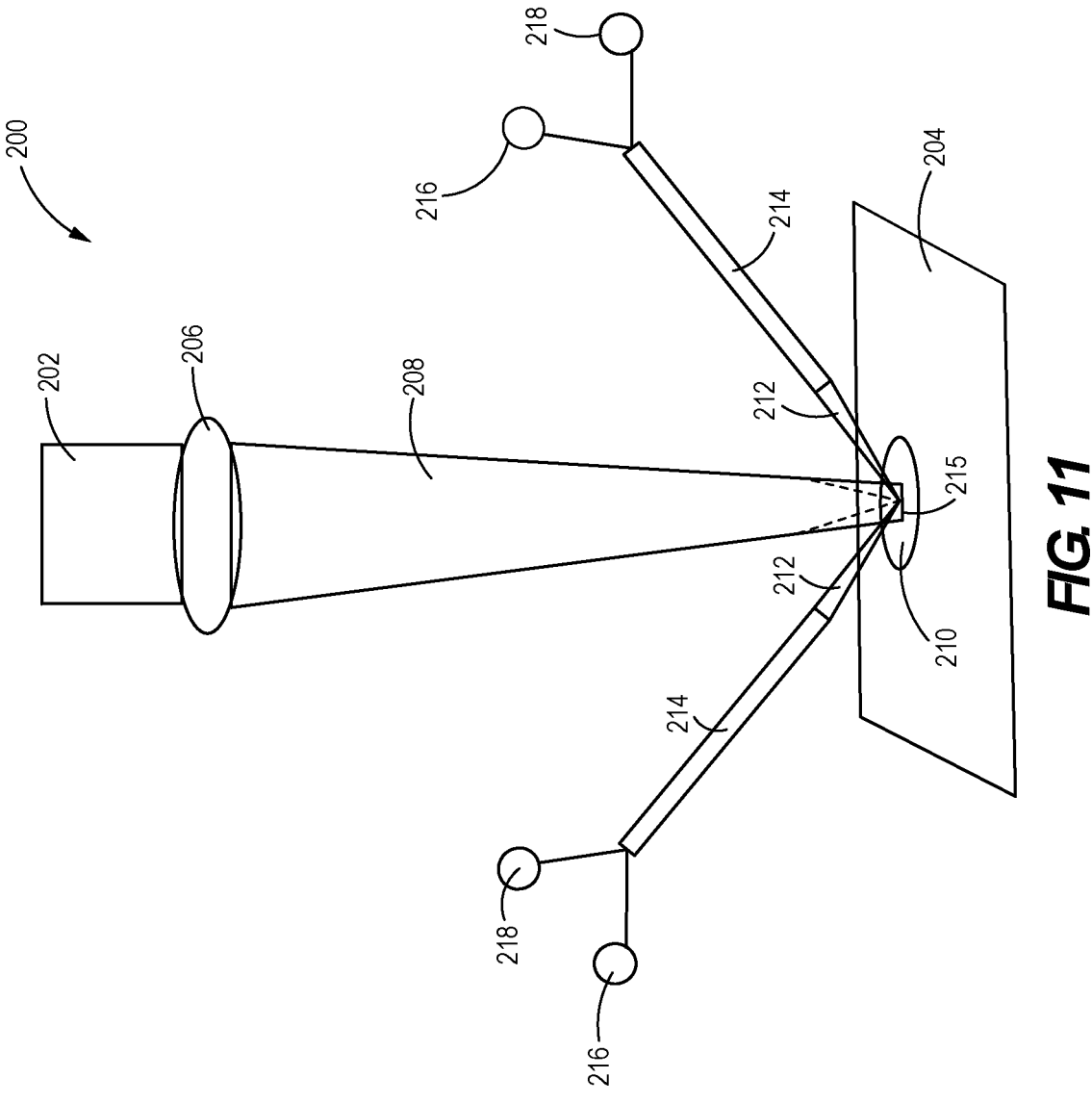
FIG. 11 is a schematic illustration of a material deposition assembly for use with the computer numerically controlled machine of FIG. 1.

The computer numerically controlled machine 100 may include a material deposition assembly for performing additive manufacturing processes. An exemplary material deposition assembly 200 is schematically illustrated in FIG. 11 as including an energy beam 202 capable of being directed toward a substrate 204. The substrate 204 may be supported by one or more of the workpiece retainers, such as chucks 110, 112. The material deposition assembly 200 may further include an optic 206 that may direct a concentrated energy beam 208 toward the substrate 204, however the optic 206 may be omitted if the energy beam 202 has sufficiently large energy density. The energy beam 202 may be a laser beam, an electron beam, an ion beam, a cluster beam, a neutral particle beam, a plasma jet, or a simple electrical discharge (arc) provided by a source coupled to one of the tool holders of the computer numerically controlled machine 100. The concentrated energy beam 208 may have an energy density sufficient to melt a small portion of the growth surface substrate 204, thereby forming a melt-pool 210, without losing substrate material due to evaporation, splattering, erosion, shock-wave interactions, or other dynamic effects. The concentrated energy beam 208 may be continuous or intermittently pulsed.

The melt-pool 210 may include liquefied material from the substrate 204 as well as added feed material. Feed material may be provided as a feed powder that is directed onto the melt-pool 210 in a feed powder/propellant gas mixture 212 exiting one or more nozzles 214. The nozzles 214 may fluidly communicate with a feed powder reservoir 216 and a propellant gas reservoir 218. The nozzles 214 create a flow pattern of feed powder/propellant gas mixture 212 that may substantially converge into an apex 215, or region of smallest physical cross-section so that the feed powder is incorporated into the melt-pool 210. As the material deposition assembly 200 is moved relative to the substrate 204, the assembly traverses a toolpath that forms a bead layer on the substrate 204. Additional bead layers may be formed adjacent to or on top of the initial bead layer to fabricate solid, three-dimensional objects.

Depending on the materials used and the object tolerances required, it is often possible to form net shape objects, or objects which do not require further machining for their intended application (polishing and the like are permitted). Should the required tolerances be more precise than are obtainable by the material deposition assembly 200, a subtractive finishing process may be used. When additional finishing machining is needed, the object generated by the deposition assembly 200 prior to such finishing is referred to herein as "near-net shape" to indicate that little material or machining is needed to complete the fabrication process.

The material deposition assembly may be provided in a different arrangement, and use a different manner of additively building a three-dimensional object, than that shown in FIG. 11. Exemplary methods include selective laser melting, selective powder melting, selective laser sintering, powder bed fusion, laser-powder bed fusion, electron beam powder bed fusion, binder jetting, and fused deposition modeling. In selective laser melting (SLM), for example, the object to be produced is built up in layers using a fine-grained, powdered, raw material according to CAD data or geometry description data derived therefrom, in that the raw material is solidified or melted by irradiating selective points according to a cross-sectional design of the object assigned to the respective layer. In this way, the individual layers are also joined together. The irradiation is normally by means of laser radiation, wherein the beam deflecting apparatus for deflecting the laser beam is controlled by means of a control apparatus on the basis of the geometry description data of the build object. The control information is usually derived from CAD data by a microcomputer or processing computer according to a corresponding program.

The laser beam draws on the most recently prepared layer of raw material the cross-sectional design assigned to this layer of the object in order to melt the raw material selectively according to the cross-sectional design. Such an irradiation step is then usually followed by preparing the next powdered material layer on the layer that has just been melted selectively and in some regions by irradiation. After forming a sufficiently smooth layer of powdered material on the surface another irradiation step is performed in the manner explained above. The object is thus created layer by layer, whereby the consecutively produced cross-sectional layers of the object are melted together such that they adhere to one another. Various metals can be used as the powdered materials including e.g. steel, titanium, gold, tantalum etc. Ceramic powdered material or multi-component powder can also be used for selective laser melting. Additional details of the SLM process are provided in U.S. Patent Application Publication No. 2014/0332507 to Fockele, the entirety of which is incorporated by reference herein.

Figure 12:
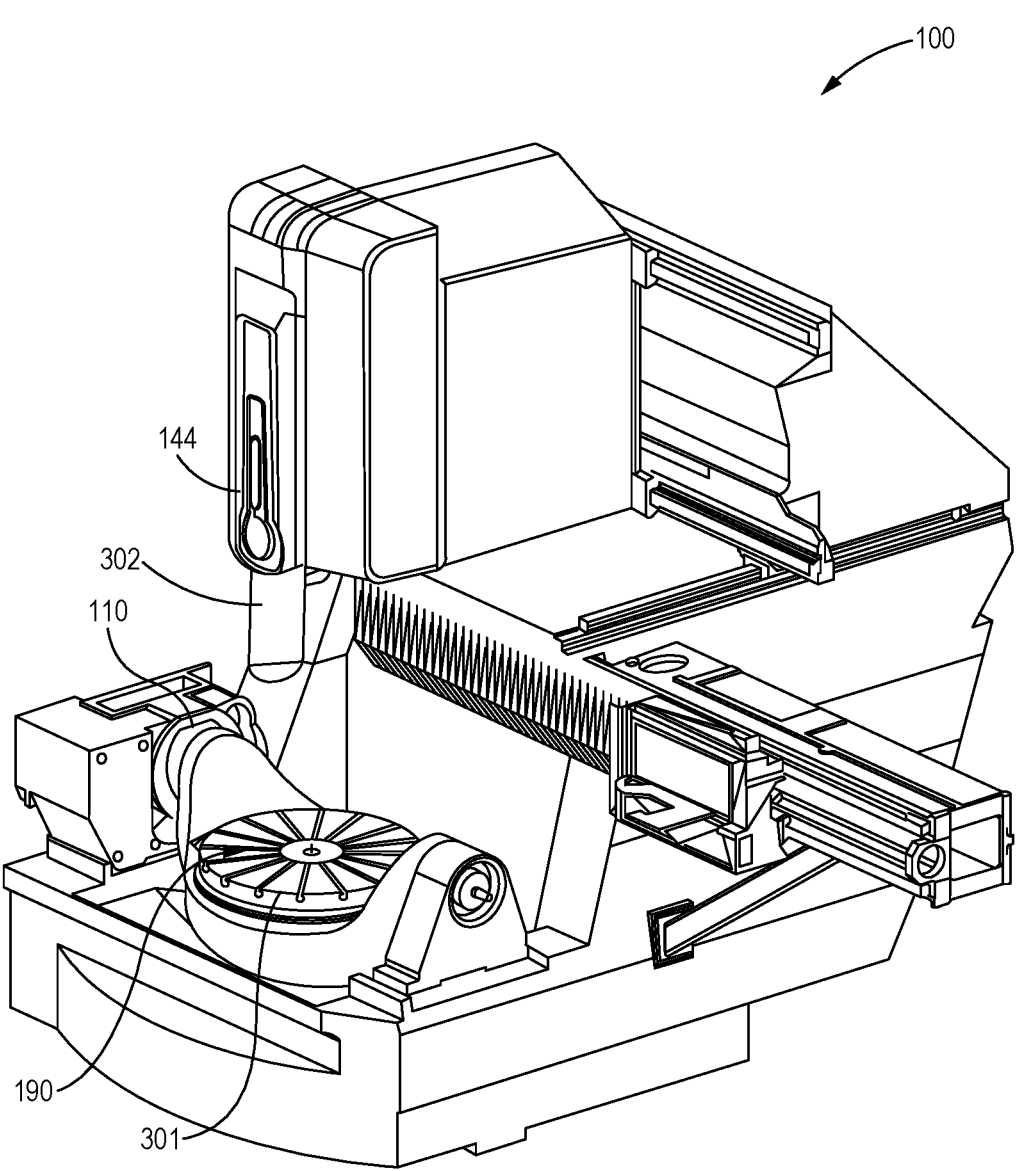
FIG. 12 is a perspective view of a machining area of a computer numerically controlled machine configured to execute a mechanical test on a test specimen.

The computer numerically controlled machine 100 further may be adapted to mechanically test specimens formed of additive manufacturing material. For example, FIG. 12 illustrates the machining area 190 of the computer numerically controlled machine 100 configured to conduct mechanical tests on specimens formed by additive manufacturing to assess material quality. A carrier plate 300 (illustrated at FIG. 13) is attached to a substrate 301 coupled to at least a first tool holder, such as the chucks 110, 112. A testing tool 302 is attached to at least a second tool holder, such as the spindle 144. The testing tool 302 permits test data indicative of mechanical properties of the test specimen to be obtained as the testing tool 302 mechanically engages the test specimen, as understood more fully below.

Figure 13:
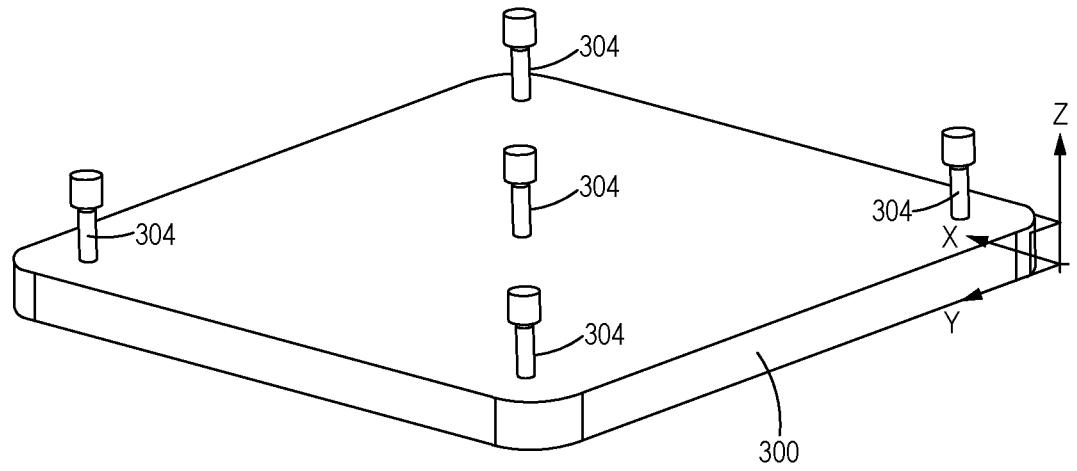
FIG. 13. is an enlarged perspective view of a carrier plate having multiple test specimens formed of an additive manufacturing material.
Figure 14:
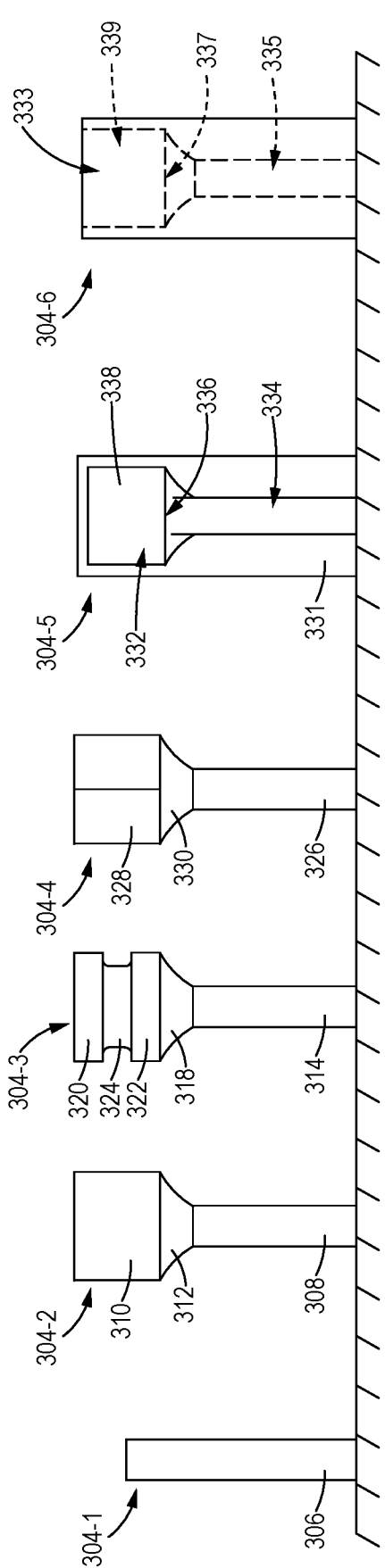
FIG. 14 is a side elevation view of different types of test specimen configurations.

The carrier plate 300 includes at least one test specimen 304 formed of an additive manufacturing material. As shown in FIG. 13, for example, five test specimens 304 are formed on the carrier plate 300. The test specimens 304 may be configured according to the type of mechanical test to be performed. FIG. 14 illustrates six different test specimen configurations. For example, a first test specimen 304-1 is formed with a cylindrical shaft 306, which facilitates axial and frictional engagement with the testing tool 302. A second test specimen 304-2 is formed with a shaft 308 and a uniformly dimensioned head 310 joined by a transition section 312, which facilitates axial and frictional engagement with the testing tool 302. A third test specimen 304-3 is formed with a shaft 314 and a variably-dimensioned head 316 joined by a transition section 318. In the illustrated example, the variably-dimensioned head 316 includes first and second cylindrical sections 320, 322 joined buy a recessed channel section 324. The third test specimen 304-3 facilitates translational and frictional engagement with the testing tool 302. A fourth test specimen 304-4 is formed with a shaft 326 and a rectilinear-dimensioned head 328 joined by a transition section 330, which facilitates axial and interference engagement with the testing tool 302. The rectilinear-dimensioned head 328 may have a triangular, square, rectangular, or other shaped cross-section. A fifth test specimen 304-5 includes a body 331 of solid, additive manufactured material. A common or specific machine tool may be used to finish the body 331 into a final specimen shape 332 having a shaft 334, a transition section 336, and a head 338. Finally, a sixth test specimen 304-6 is inverted to form a void 333 in which the testing tool 302 may be inserted. In the illustrated example, the void 333 includes a shaft receiving section 335, a transition receiving section 337, and a head receiving section 339. The sixth test specimen 304-6 permits the testing tool 302 to be inserted into the void 333.

Figure 15:
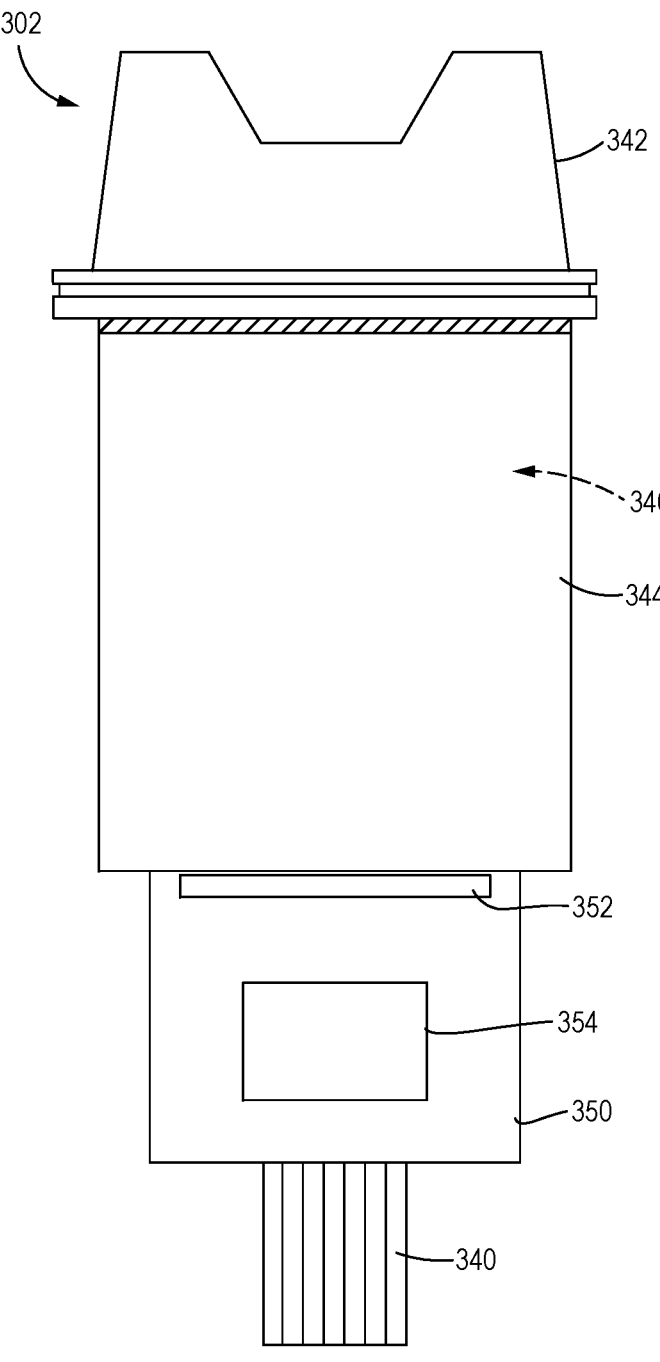
FIG. 15 is an enlarged side elevation view of a testing tool used to perform a mechanical test on a test specimen.

The testing tool 302 is shown in greater detail in FIG. 15. The testing tool 302 includes a specimen interface 340 for mechanically engaging at least one of the test specimens 304. The testing tool 302 further includes a tool holder interface 342 to permit releasable coupling of the testing tool 302 to the spindle 144. A housing 344 is coupled to the tool holder interface 342 and defines an internal chamber 346 sized to receive electrical components described below. A rigid body 350 is coupled to the housing 344 and carries a first sensor 352 and a second sensor 354. The second sensor 354 may also be mounted at the interface of the rigid body 350 and the housing 344 in a manner that allows measurement of deviations between the two. While two sensors are shown on the rigid body 350, a single sensor or more than two sensors may be provided. Each of the first sensor 352 and the second sensor 354 is configured to directly measure a set of test data indicative of mechanical properties of the test specimen 304. For example, the first and second sensors 352, 354 may be analog or digital devices that may be based on one or a plurality of measurement principles such as potentiometric transduction, resistive transduction, capacitive transduction, electromagnetic transduction, inductive transduction, piezoelectric transduction and/or magnetostrictive transduction. Commercial sensors based on these principles may include potentiometers, linear variable differential transformers (LVDTs), resolvers, DC Tachometers, Capacitive sensors, strain gauges, accelerometers, acoustic emission sensors, Piezo-electric Dynamometers, thermocouples or other commercial implementations, or combinations thereof. The specimen interface 340 is coupled to the rigid body 350 so that, when the specimen interface 340 mechanically engages the test specimen 304, the first and/or second sensor 352, 354 measures data indicative of mechanical forces being applied. Alternatively, the sensors 352, 354 may be omitted and the data indicative of mechanical forces may be inferred from control signals used to operate computer numerically controlled machine 100.

Figure 16:
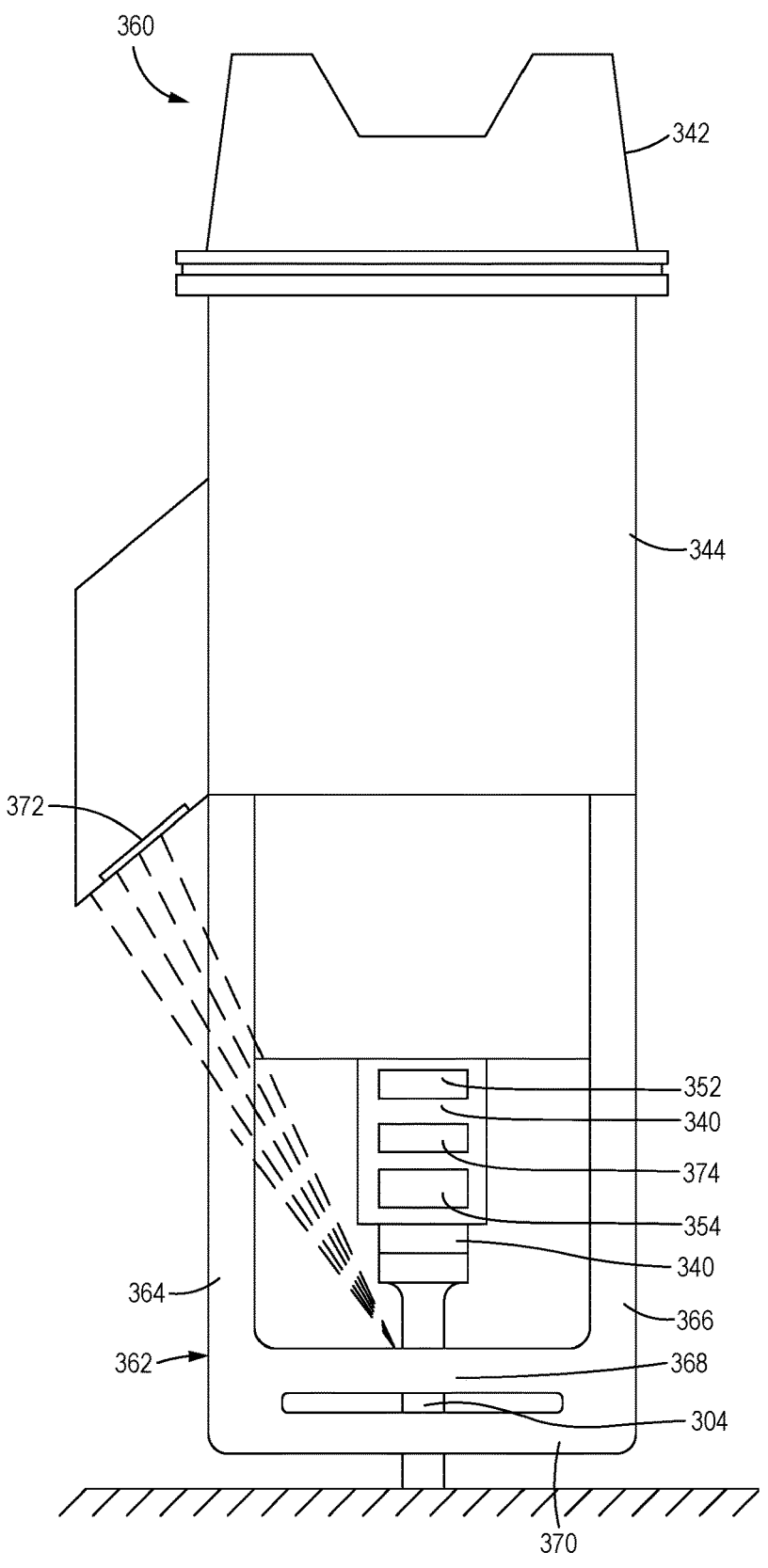
FIG. 16 is an enlarged side elevation view of an alternative embodiment of a testing tool used to perform a mechanical test on a test specimen.

An alternative example of a testing tool 360 is illustrated in FIG. 16. The testing tool 360 is similar to the testing tool 302 described above, but also includes provisions for applying heat to the test specimen 304 during mechanical engagement by the testing tool 302. Accordingly, the testing tool 360 includes the tool holder interface 342, housing 344, rigid body 350, first and second sensors 352, 354, and the specimen interface 340. Additionally, the testing tool 360 includes a heater 362 for delivering heat to the test specimen 304. In the illustrated embodiment, the heater 362 is coupled to the housing 344 and includes opposing side walls 364, 366 extending downwardly past the specimen interface 340. First and second heat bars 368, 370 span the space between the side walls 364, 366 and are placed at elevations that position them proximate the test specimen 304 when the specimen interface 340 engages the test specimen 304. Additionally, the testing tool 360 may include a temperature sensor, such as an optical temperature sensor 372, shown coupled to the housing 344, a conductive temperature sensor 374, shown coupled to the rigid body 350, or both.

Figure 17:
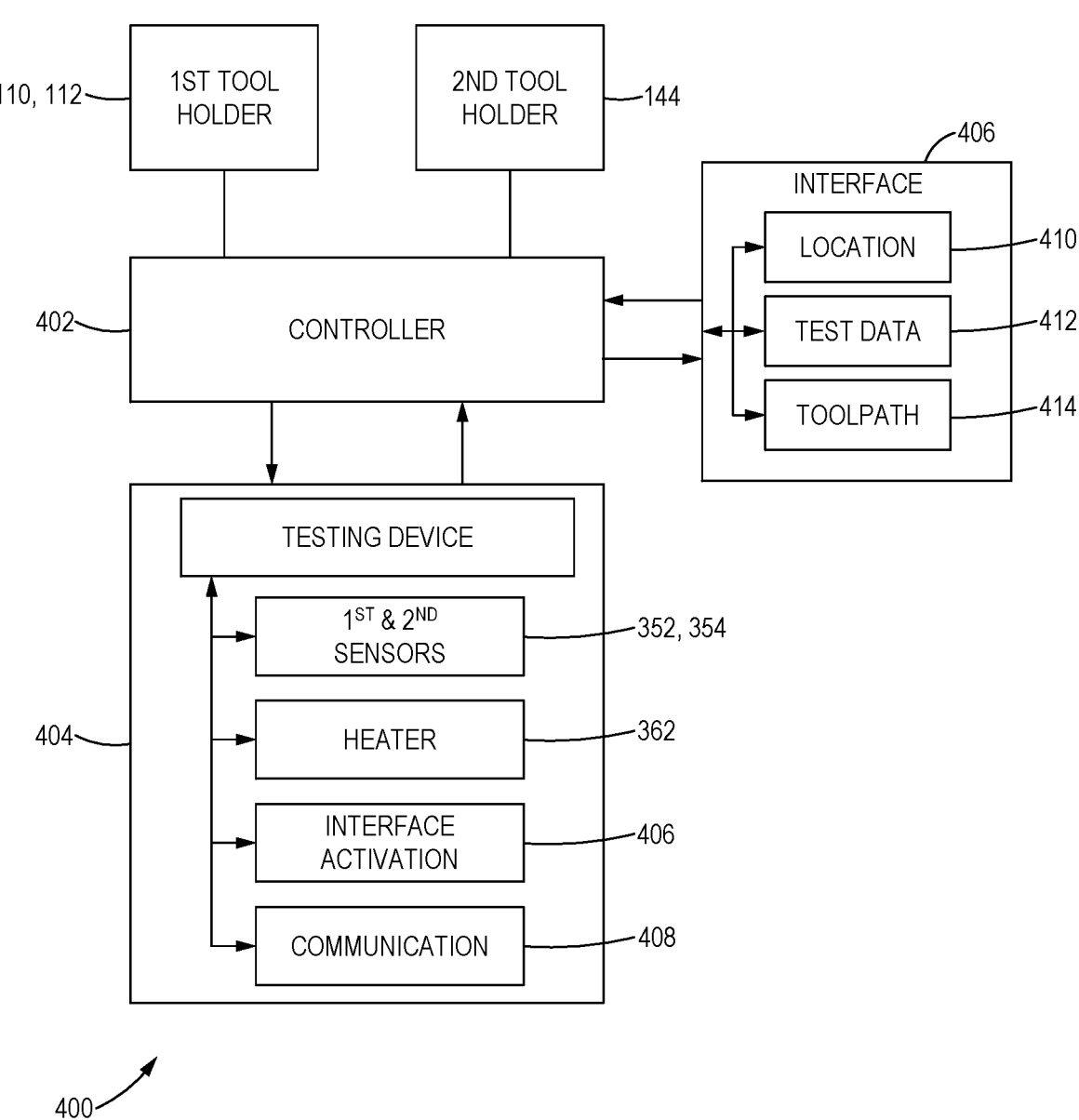
FIG. 17 is a schematic diagram of tool control circuitry for operating the computer numerically controlled machine to execute a mechanical test on a test specimen.

Tool control circuitry 400 for operating the computer numerically controlled machine 100, including the testing tool 302 or 360, is schematically illustrated in FIG. 17. The tool control circuitry 400 may include a controller 402 operatively coupled to testing device circuitry 404 and interface circuitry 406. The controller 402 may be provided specific to the testing tool 302 or 360, or may be provided with the existing computer numerically controlled machine 100. The controller 400 is also operatively coupled to the first tool holder holding the carrier plate 300, such as the chucks 110, 112, and the second tool holder holding the testing tool 302 or 360, such as the spindle 144. The controller 402 may include one or more central processing units and one or more memory devices configured to store instructions. The testing device circuitry 404 may include the first sensor 352, the second sensors 354, and any additional sensors, if provided. A sensor module provided with the testing device circuitry 404 may permit data to be collected, stored, organized, and transferred in a manner and at a frequency that is suited to the particular mechanical test being deployed. The heater module 362 may include functionality to control both heating and temperature measurement so that standard control algorithms (such as PID) may be used to maintain the specimen 304 at a constant, pre-set temperature for a given test. An interface activation module 406 may include sensors for determining and ensuring alignment and, depending on readings, to activate or deactivate a clamping mechanism to connect the specimen interface 340 with the specimen 304. A communications module 408 is configured to compile, organize, and transfer data, via wire or wirelessly, using a commercially available communication protocol. The interface circuitry 406 may include a location module 410 where approximate location data for the specimen 304 is entered. After validation, measured location data may be displayed and respective deviation information can be recorded. A test data module 412 is configured to display and store results for respective test samples. For example, if five test specimens 304 are provided as shown in FIG. 13, the test data module 412 may record and store the relevant data for each sample after a test is complete. A toolpath control module 414 is configured to create testing programs, such as by using a kinematic algorithm, or to receive pre-existing testing programs. During operation of a test, the programs are transferred to the controller 402.

Figure 18:
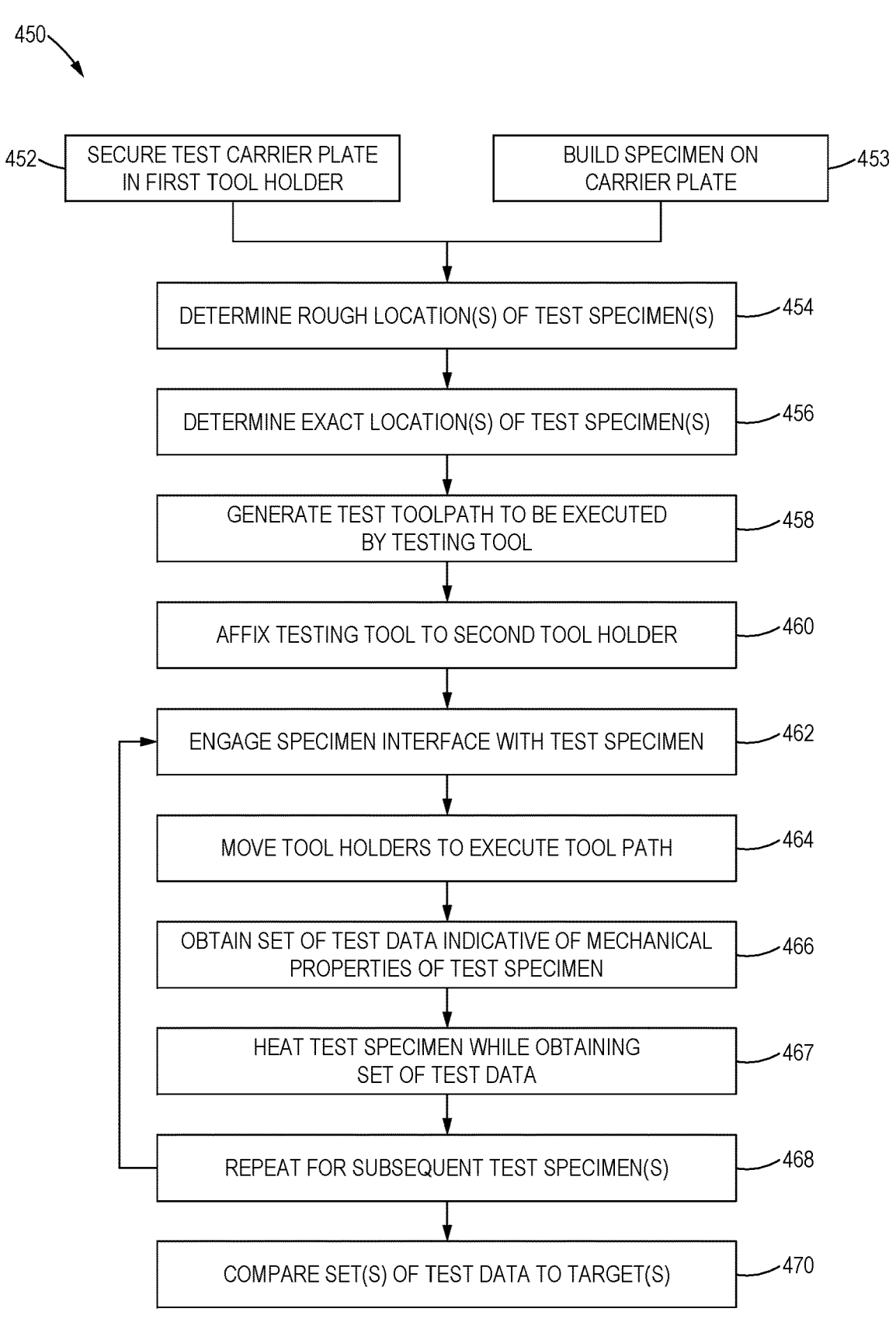
FIG. 18 is a block diagram illustrating a method of mechanically testing a test specimen.

The instructions stored on the one or more memory devices, when executed by the one or more central processing units, cause the tool control circuitry to perform a material quality testing method. For example, as schematically illustrated in FIG. 18, an exemplary material quality testing method 450 at block 452 includes securing a test specimen 304, which is affixed to the carrier plate 300, into the computer numerically controlled machine 100, such as by coupling the carrier plate 300 to the first tool holder, such as the chucks 110, 112. Alternatively, the carrier plate may already be attached to the chucks 110, 112 while the test specimen is additively manufactured on the carrier plate 300 using the material deposition assembly 200, as indicated at block 453. At block 454, the method 450 optionally includes determining rough location(s) of the one or more test specimens 304. The method 450 continues at block 456 by optionally determining exact location(s) of the specimen(s).

At block 458 of the method 450, the tool control circuitry 400, in particular the toolpath module 414 of the interface module 406, generates a first test toolpath to be executed by the testing tool 302 or 360 relative to the test specimen 304. The first test toolpath may be based, at least in part, on the rough and/or exact location of the test specimen 304 and the type mechanical test to be performed, along with a knowledge of the kinematic model of the respective numerically controlled machine. This information is then used to define the trajectory of the tool holder(s), testing tool, and carrier plate to create a known and recorded relative motion that is suited for the mechanical test to be performed. Exemplary mechanical tests may include tensile, torsional, fatigue, bending, and fracture testing.

The method continues at block 460, by affixing the testing tool 302 or 360 to the second tool holder, such as the spindle 144. Next, at block 462, the first and second tool holders are positioned so that the specimen interface 340 of the testing tool 302 or 360 engages a first test specimen 304. At block 464, the method 450 continues by causing relative movement between the first and second tool holders so that the testing tool 302 or 360 executes the first test toolpath relative to the first test specimen 304. At block 466, a first set of test data indicative of mechanical properties of the first test specimen 304 is obtained as the testing tool executes the first test toolpath. For example, at block 464, the first test toolpath may causes the testing tool 302 or 360 to impart at least one of a rotational force, a translational force, a tension force, a compression force, or an impact force on the first test specimen 304, and at block 466 obtaining the first set of test data indicative of mechanical properties of the first test specimen 304 may include obtaining data indicative of a magnitude of the at least one of the rotational force, the translational force, the tension force, the compression force, or the impact force. The method optionally includes, at block 467, heating the first test specimen 304 with the heater 362 while the testing tool 302 or 360 executes the first test toolpath relative to the first test specimen 304.

Obtaining the set of test data indicative of mechanical properties of the test specimen 304 (block 466) may include obtaining mechanical stress data, mechanical strain data, or both. Furthermore, the set of test data may be inferred from operating conditions of the computer numerically controlled machine 100, or may be directly measured by at least the first sensor 352 provided on the testing tool 302 or 360.

At block 468, the method 450 may continue by repeating blocks 462, 464, and 466 for second and subsequent test specimens 304 provided on the carrier plate 300. That is, should the carrier plate 300 further include a second test specimen 304 formed of an additive manufacturing material, the method 450 further may cause the tool control circuitry 400 to position the first and second tool holders so that the specimen interface 340 of the testing tool 302 or 360 engages the second test specimen 304 (block 462), cause relative movement between the first and second tool holders so that the testing tool 302 or 360 executes a second test toolpath relative to the second test specimen 304 (block 464), and obtain a second set of test data indicative of mechanical properties of the second test specimen 304 as the testing tool executes the second test toolpath (block 466).

At block 470, the method 450 may continue by comparing each set of test data indicative of mechanical properties of an associated test specimen to a target, and determining a quality metric as a function of a difference between the set of test data and the target, and/or considering the result to a statistical population of data to determine whether the result can be identified as coming from the same or a different population when analyzing a plurality of samples over many manufacturing iterations.

As supplied, the apparatus may or may not be provided with a tool or workpiece. An apparatus that is configured to receive a tool and workpiece is deemed to fall within the purview of the claims recited herein. Additionally, an apparatus that has been provided with both a tool and workpiece is deemed to fall within the purview of the appended claims. Except as may be otherwise claimed, the claims are not deemed to be limited to any tool depicted herein.

All references, including publications, patent applications, and patents, cited herein are hereby incorporated by reference. The description of certain embodiments as "preferred" embodiments, and other recitation of embodiments, features, or ranges as being preferred, is not deemed to be limiting, and the claims are deemed to encompass embodiments that may presently be considered to be less preferred. All methods described herein can be performed in any suitable order unless otherwise indicated herein or otherwise clearly contradicted by context. The use of any and all examples, or exemplary language (e.g., "such as") provided herein, is intended to illuminate the disclosed subject matter and does not pose a limitation on the scope of the claims. Any statement herein as to the nature or benefits of the exemplary embodiments is not intended to be limiting, and the appended claims should not be deemed to be limited by such statements. More generally, no language in the specification should be construed as indicating any non-claimed element as being essential to the practice of the claimed subject matter. The scope of the claims includes all modifications and equivalents of the subject matter recited therein as permitted by applicable law. Moreover, any combination of the above-described elements in all possible variations thereof is encompassed by the claims unless otherwise indicated herein or otherwise clearly contradicted by context. The description herein of any reference or patent, even if identified as "prior," is not intended to constitute a concession that such reference or patent is available as prior art against the present disclosure.

What is claimed is:

1. A material quality testing method executed by a computer numerically controlled machine, the method comprising:

coupling a carrier plate to a first tool holder of the computer numerically controlled machine, the carrier plate including a first test specimen formed of an additive manufacturing material;

coupling a testing tool to a second tool holder of the computer numerically controlled machine, the testing tool including a specimen interface;

engaging the first test specimen with the specimen interface of the testing tool;

causing relative movement between the first and second tool holders so that the testing tool executes a first test toolpath relative to the first test specimen; and obtaining a first set of test data indicative of mechanical properties of the first test specimen as the testing tool executes the first test toolpath.

2. The method of claim 1, in which the carrier plate further includes a second test specimen formed of an additive manufacturing material, the method further comprising:

engaging the second test specimen with the specimen interface of the testing tool;

causing relative movement between the first and second tool holders so that the testing tool executes a second test toolpath relative to the second test specimen; and obtaining a second set of test data indicative of mechanical properties of the second test specimen as the testing tool executes the second test toolpath.

3. The method of claim 1, further comprising, prior to engaging the first test specimen with the specimen interface of the testing tool, determining a location of the first test specimen and generating first test toolpath based on the location of the first test specimen.

4. The method of claim 1, in which the second tool holder comprises a spindle of the computer numerically controlled machine.

5. The method of claim 1, in which the first set of test data indicative of mechanical properties of the first test specimen comprises at least one of mechanical stress and mechanical strain.

6. The method of claim 1, in which the first set of test data is inferred from operating conditions of the computer numerically controlled machine.

7. The method of claim 1, in which the first set of test data is directly measured by at least a first sensor provided on the testing tool.

8. The method of claim 1, in which the first test toolpath causes the testing tool to impart at least one of a rotational force, a translational force, a tension force, a compression force, or an impact force on the first test specimen, and in which obtaining the first set of test data indicative of mechanical properties of the first test specimen comprises obtaining data indicative of a magnitude of the at least one of the rotational force, the translational force, the tension force, the compression force, or the impact force.

9. The method of claim 1, in which the first test specimen is formed on the carrier plate while coupled the first tool holder of the computer numerically controlled machine.

10. The method of claim 1, further comprising heating the first test specimen while the testing tool executes the first test toolpath relative to the first test specimen.

11. The method of claim 1, further comprising:

comparing the first set of test data indicative of mechanical properties of the first test specimen to a target; and determining a quality metric as a function of a difference between the first set of test data and the target.

12. A computer numerically controlled machine, comprising:

a first tool holder coupled to a carrier plate, the carrier plate including a first test specimen formed of an additive manufacturing material;

a second tool holder coupled to a testing tool, the testing tool including a specimen interface;

tool control circuitry operatively coupled to the first tool holder and the second tool holder, the tool control circuitry comprising one or more central processing units and one or more memory devices, the one or more memory devices storing instructions that, when executed by the one or more central processing units, cause the tool control circuitry to:

position the first and second tool holders so that the specimen interface of the testing tool engages the first test specimen;

cause relative movement between the first and second tool holders so that the testing tool executes a first test toolpath relative to the first test specimen; and obtain a first set of test data indicative of mechanical properties of the first test specimen as the testing tool executes the first test toolpath.

13. The computer numerically controlled machine of claim 12, in which the carrier plate further includes a second test specimen formed of an additive manufacturing material, and in which the instructions further cause the tool control circuitry to:

position the first and second tool holders so that the specimen interface of the testing tool engages the second test specimen;

cause relative movement between the first and second tool holders so that the testing tool executes a second test toolpath relative to the second test specimen; and obtain a second set of test data indicative of mechanical properties of the second test specimen as the testing tool executes the second test toolpath.

14. The computer numerically controlled machine of claim 12, in which the second tool holder comprises a spindle.

15. The computer numerically controlled machine of claim 12, in which the testing tool further includes a sensor for directly measuring the first set of test data indicative of mechanical properties of the first test specimen.

16. The computer numerically controlled machine of claim 15, in which the sensor comprises a stress gauge or a strain gauge.

17. The computer numerically controlled machine of claim 12, in which the instructions further cause the tool control circuitry to:

when executing the first test toolpath, cause the testing tool to impart at least one of a rotational force, a translational force, a tension force, a compression force, or an impact force on the first test specimen; and when obtaining the first set of test data indicative of mechanical properties of the first test specimen, obtain data indicative of a magnitude of the at least one of the rotational force, the translational force, the tension force, the compression force, or the impact force.

18. The computer numerically controlled machine of claim 12, in which the testing tool further includes a heater configured to heat the first test specimen while the testing tool executes the first test toolpath relative to the first test specimen.

19. The computer numerically controlled machine of claim 12, in which the instructions further cause the tool control circuitry to:

compare the first set of test data indicative of mechanical properties of the first test specimen to a target; and determine a quality metric as a function of a difference between the first set of test data and the target.

20. A computer numerically controlled machine, comprising:

a first tool holder coupled to a carrier plate;

a second tool holder;

a material deposition assembly;

a testing tool including a specimen interface;

tool control circuitry operatively coupled to the first tool holder and the second tool holder, the tool control circuitry comprising one or more central processing units and one or more memory devices, the one or more memory devices storing instructions that, when executed by the one or more central processing units, cause the tool control circuitry to:

couple the material deposition assembly to the second tool holder;

form at least a first test specimen on the carrier plate using the material deposition assembly;

detach the material deposition assembly from the second tool holder;

couple the testing tool to the second tool holder;

position the first and second tool holders so that the specimen interface of the testing tool engages the first test specimen;

cause relative movement between the first and second tool holders so that the testing tool executes a first test toolpath relative to the first test specimen; and obtain a first set of test data indicative of mechanical properties of the first test specimen as the testing tool executes the first test toolpath.

* * * * *